July 29, 1941.  E. C. STANTON  2,251,077
OPTICAL PROJECTION APPARATUS
Filed Aug. 24, 1939  4 Sheets-Sheet 1

Inventor
Edmund C. Stanton,
By Stone, Boyden & Mack,
Attorneys

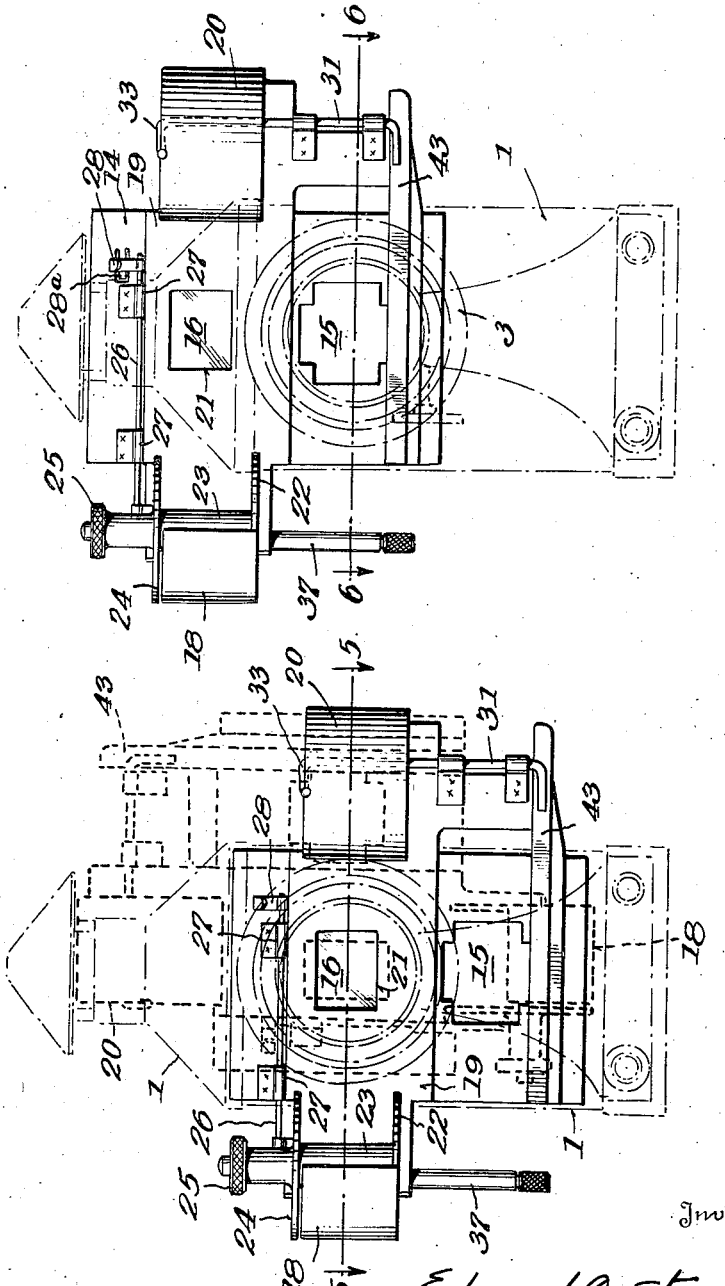

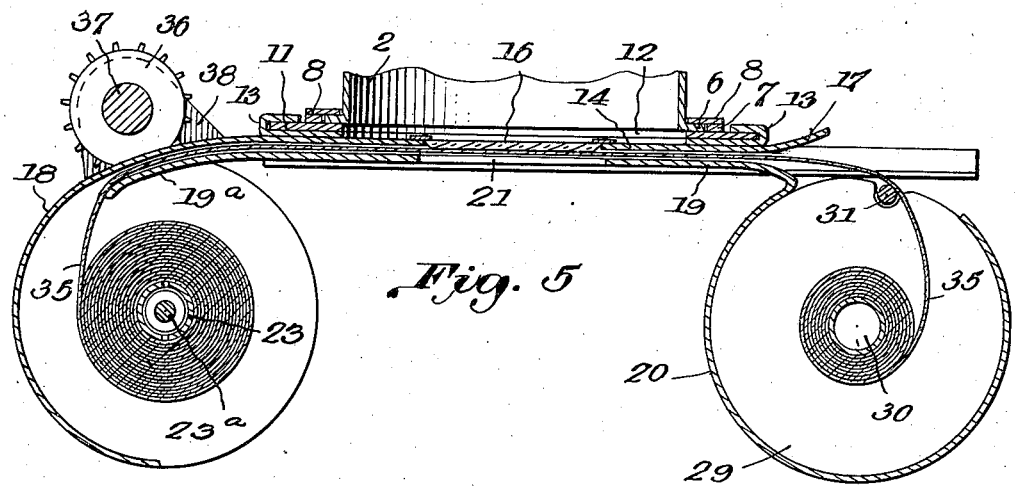
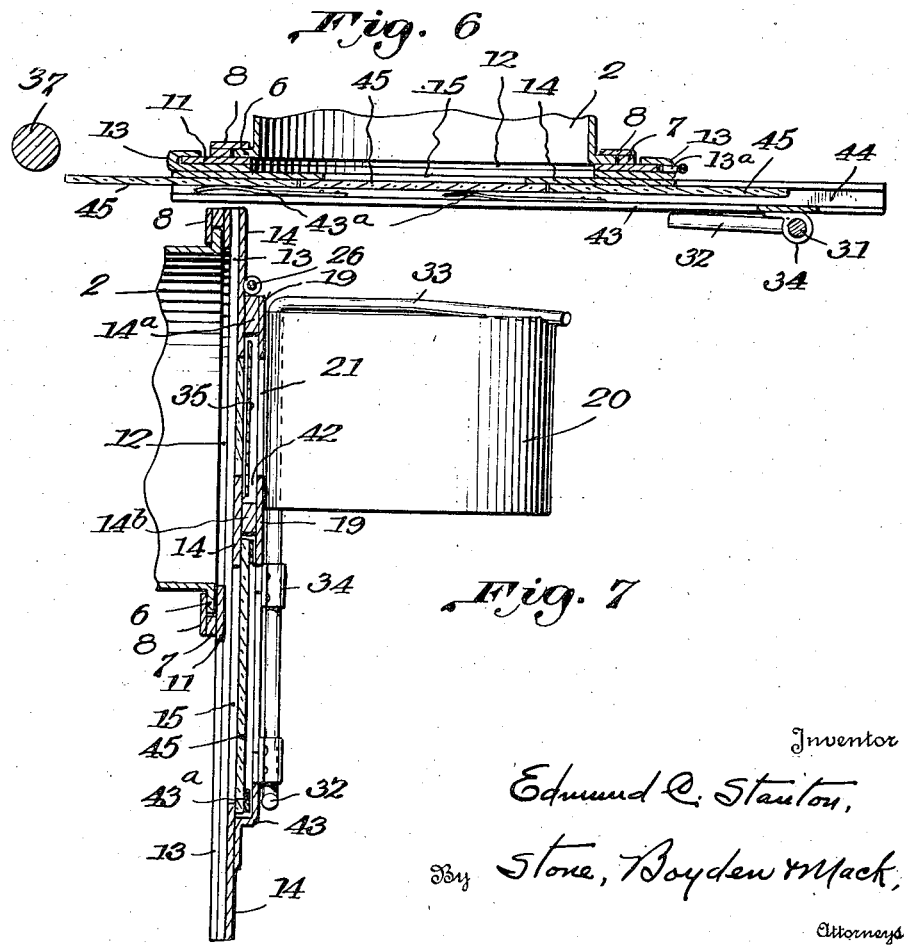

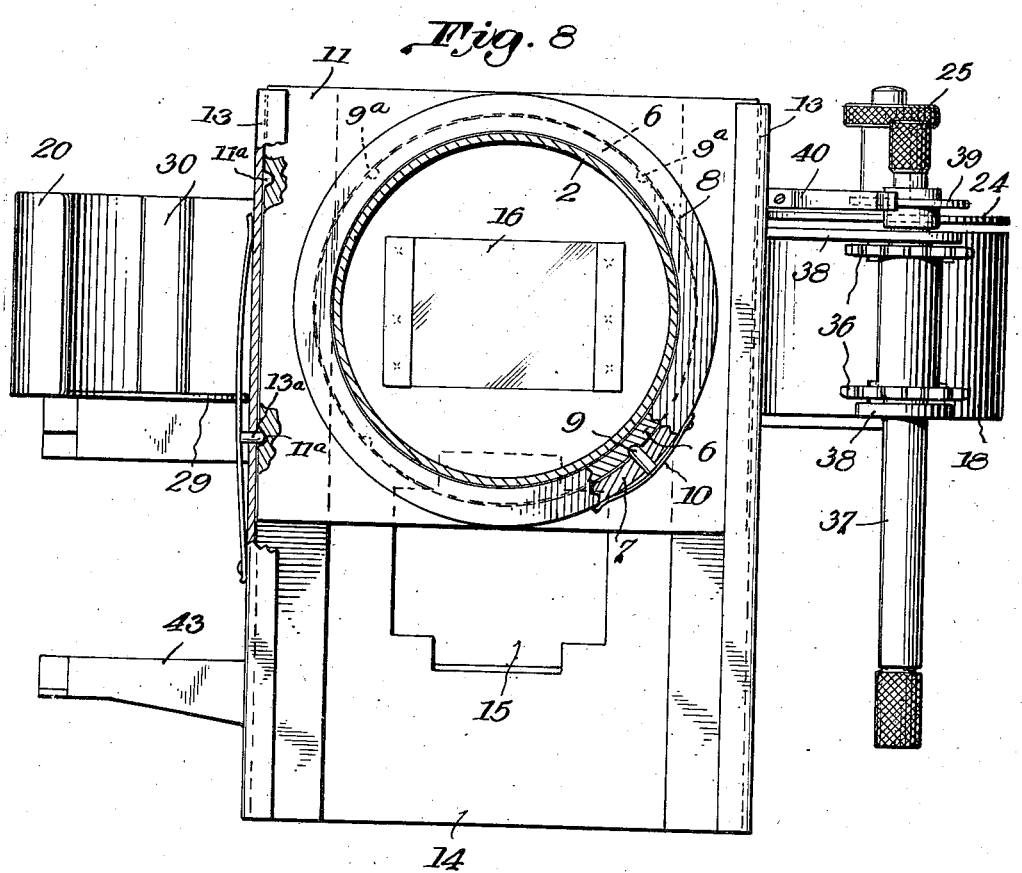

Patented July 29, 1941

2,251,077

UNITED STATES PATENT OFFICE 2,251,077

OPTICAL PROJECTION APPARATUS

Edmund C. Stanton, Bethesda, Md.

Application August 24, 1939, Serial No. 291,775

6 Claims. (Cl. 88—28)

This invention relates to optical projection apparatus, and more particularly to improved means for holding and guiding the picture elements to be projected.

From an early date it has been the practice to provide a guide or track along which the slides carrying the pictures to be projected may be moved into and out of the optical axis. These slides consist either of glass plates or the like, or of flexible elements mounted in rigid frames or holders.

More recently it has become common practice to equip projecting lanterns with means whereby a continuous flexible strip, such as a photographic film, may be mounted on the apparatus and may be fed transversely so as to bring the pictures on the film successively into display or projecting position.

It frequently happens that, when a projecting lantern is being used, as for example in connection with an illustrated lecture, that some of the material to be exhibited is in the form of a continuous strip or film while other of the material is in the form of independent plates or slides, and the lecturer may often wish to shift from one type of picture element to the other, during the course of the lecture. It has heretofore been necessary, in cases of this kind, to entirely remove the picture film or strip from the apparatus in order to insert a plate or slide therein, and this causes delay and inconvenience.

The primary object of the present invention is, therefore, to provide apparatus comprising a pair of picture element guiding means or tracks, disposed adjacent each other, and so mounted that either one may be brought into the optical axis of the apparatus as desired. In this way, a pair of continuous picture strips, for example, may be employed, and in projecting the pictures, it is possible to shift readily from one to the other without interrupting the program. Or, in case it is desired to use both a continuous picture strip and a series of independent slides, it is possible to shift from the strip to the slides or vice versa at will, while the apparatus is in operation.

In order that the invention may be readily understood, reference is had to the accompanying drawings forming part of this specification and in which—

Figs. 3 and 4 are front elevations of the apparatus shown in Figs. 1 and 2, these figures illustrating the picture holding means in two different positions;

Fig. 5 is a fragmentary section on an enlarged scale taken on the line 5—5 of Fig. 3, looking in the direction of the arrows;

Fig. 6 is a fragmentary section on an enlarged scale taken on the line 6—6 of Fig. 4, looking in the direction of the arrows;

Fig. 7 is a section on an enlarged scale on the line 7—7 of Fig. 2, looking in the direction of the arrows; and Fig. 8 is a transverse section on an enlarged scale on the line 8—8 of Fig. 1, looking in the direction of the arrows, parts being broken away.

Figure 1:
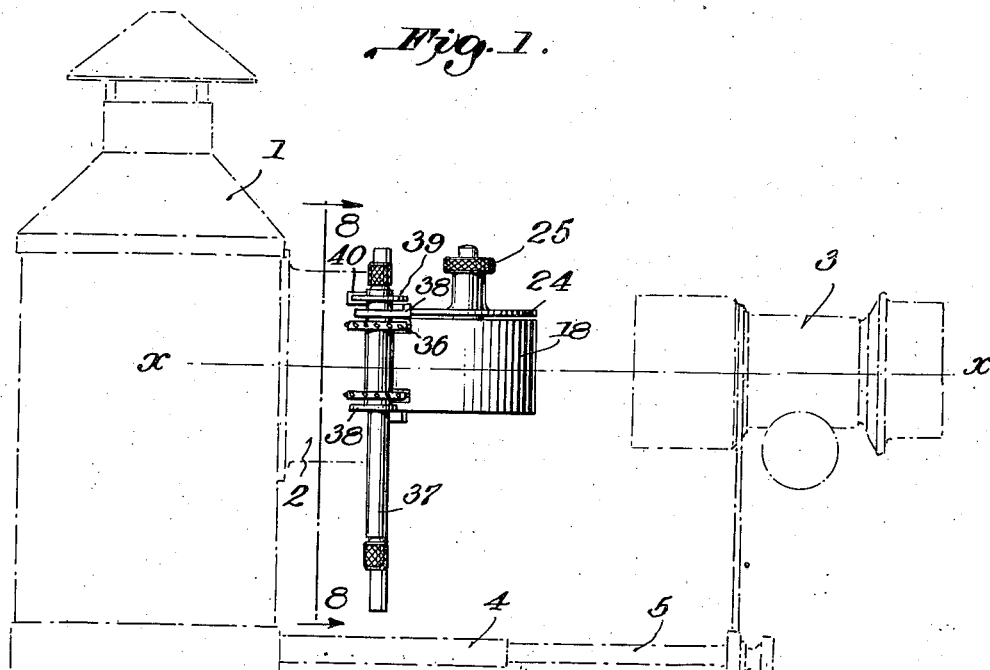
Fig. 1 is a side elevation of a projecting lantern shown conventionally in broken lines and illustrating my improved attachment in full lines as applied thereto.
Figure 2:
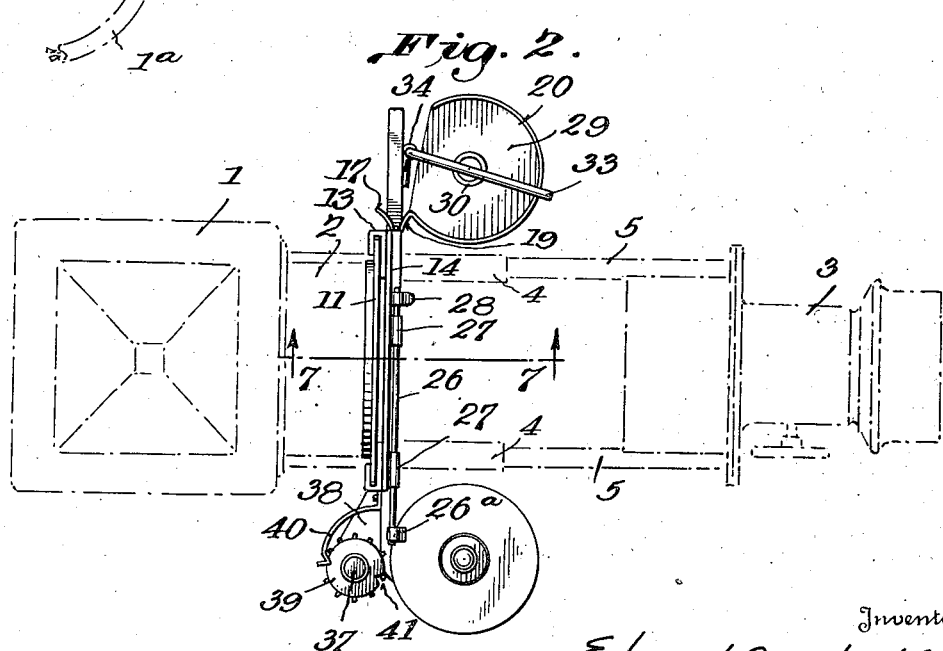
Fig. 2 is a plan view of the same.

Referring to the drawings in detail, the projection lantern which may be of any desired construction is shown as embodying a lamp housing 1, having a lens tube 2 extending from the front thereof, and in line with this lens tube and spaced therefrom is a second adjustable lens tube 3, supported by a pair of telescoping rods 4, 5, in a well known manner. Current for operating the lamp is supplied over the conductor 1a.

The extreme front end of the lens tube 2, as shown in Figs. 5, 6, and 7, is provided with an outwardly extending annular flange 6, and surrounding this flange is a ring 7 to which is secured a flat ring 8 which overlaps the rear face of the flange 6. The ring 7 is secured to a square plate 11. Thus the plate 11 is secured to the lens tube 2 by the rings 7 and 8 in such manner that it may rotate upon this lens tube and be turned to any desired angular position.

In order to maintain the plate 11 in different angular positions to which it may be turned, the outer periphery of the ring 6 is provided with notches 9a in which is adapted to engage the rounded end of a pin 9 working freely through the ring 7 and pressed toward the ring 6 by means of a spring 10, as illustrated in Fig. 8. Thus as the plate 11 is rotated on the tube 2, the pin 9 will snap into the notches 9a and will serve to retain the plate in angular positions corresponding to the location of these notches.

The plate 11 has a central circular opening 12 registering with the lens tube 2.

An elongated plate 14 of substantially the same width as the plate 11 fits against the front face of this plate, and is provided at its opposite edges with turned over portions 13, forming grooves or channels which slidably engage the edges of the plate 11 (see Figs. 5 and 6). One edge of the plate 11 is provided with a pair of notches 11a (see Fig. 8), and passing through the folded over portion 13 of the plate 14 is a spring pressed pin 13a. It will thus be seen that as the plate 14 is shifted up and down upon the plate 11, as viewed in Fig. 8, the pin 13a will snap into and out of the notches 11a and thus yieldingly hold the plate 14 and associated parts in either one of two positions to which it may be moved.

Also as shown in Figs. 4, 6, 7, and 8, the plate 14 is provided with two windows 15 and 16, the former being a simple opening, while the latter consists of an opening closed by a plate of glass or the like, as illustrated.

As seen in Fig. 5, the right hand end of the plate 14 is flared as shown at 17, and the left hand end is continued as indicated at 18 and bent around to form a cylindrical spool holder.

Secured to the plate 14 and spaced slightly therefrom, by means of strips 14a and 14b (Fig. 7), is a plate 19, the left hand end of which as viewed in Fig. 5 extends into the spool housing 18, and the right hand end of which is continued and bent to form a cylindrical film roll holder 20. The plate 19 also has a window opening 21 formed therein opposite the window 16.

A spool comprising a body 23 and heads 22 and 24 (see Figs. 3 and 4) is mounted for rotation upon a shaft 23a extending axially of the spool holder 18, and the upper head 24 of the spool is integral with a knob 25 slidably mounted on said shaft and removable therefrom so as to permit attaching the film to the spool. This removable head may be held in position by means of a locking bolt 26 slidably mounted in guides 27 (Figs. 3 and 4) and provided with an operating knob 28 frictionally engaging a retaining spring 28a struck up from the plate 14.

The cylindrical roll holder 20 has a bottom 2ⁿ and a central bobbin 30. The film roll is held in position on this bobbin by means of a retaining arm 33 extending from a shaft 31, having at its lower end a second arm 32, and journaled in bearings 34.

The flexible picture strip or film itself is indicated at 35 (Fig. 5) and is shown as being coiled partly in the holder 20 and partly on the spool 23, the film passing between the plates 14 and 19, which serve as a guide or track.

The film is provided with the usual sprocket holes and is fed by means of a pair of sprocket wheels 36 secured upon a shaft 37 journaled in bearings 38 at the side of the film track and adjacent the spool holder 18, and manually operable by knurled nuts. The sprockets, of course, project into the film track adjacent the point 19a in Fig. 5, this film track being designated 42, as indicated in Fig. 7.

In order that the operator may know when a "frame" in the film is properly centered for projection, there is secured to the shaft 37 a disc 39, having in its periphery a pair of opposite notches 41 into which a spring detent 40 is adapted to snap as the shaft 37 is rotated.

Secured rigidly to the plate 14 at a point below the film track 42, and in a position adjacent the window 15, is the guide or track adapted to receive a separate set of picture elements, such for example, as independent slides 45. This guide or track is formed at its upper edge by portions of the plates 14 and 19 as shown in Fig. 7, and at its lower edge by an angle strip 43 secured to the plate 14 and forming a channel 44 (Fig. 6).

In order to hold the slides 45 snugly against the plate 14 as they pass the window 15, leaf springs 43a are provided in the channel 44, as shown in Fig. 6.

From the foregoing it will be understood that the plate 14 carries parallel guide means or tracks for two separate sets of picture elements, namely the film track 42 and the slide track 43, 44, and that the respective picture elements are positioned by said guide means in spaced, edge to edge, non-overlapping relation, preferably in substantially the same plane. It will also be apparent that the picture elements may be independently moved along their respective guiding means, transversely of the optical axis of the apparatus, into and out of display position, in the usual manner.

It will further be seen that by moving the plate 14 relative to the plate 11 from one position to the other, in its own plane, either guide track may be brought into registry with the optical axis of the apparatus, as desired. Thus in Fig. 3 I have shown the plate 14 and associated parts in their lowermost position in which the film track 42, including the window 21, is in registry with the optical axis of the apparatus, such axis being indicated by the line $x-x$ in Fig. 1, and in this position pictures on the film strip 35 may be successively displayed by operating the feed sprockets 36.

In Fig. 4, on the other hand, I have shown the plate 14 and associated parts shifted to their uppermost position, in which position the slide track and window 15 are in registry with the optical axis of the apparatus and the pictures contained on the slides 45 may be displayed as desired by pushing them successively along the track, in the well known manner.

Thus it is possible for a lecturer, for example, to shift readily and at will from one set of picture elements to the other. Thus, if at any point in a lecture based primarily on the series of pictures carried by the picture strip or film, it is desired to interject some special view contained in an independent slide, he may shift the apparatus from the position shown in Fig. 3 to that shown in Fig. 4, in a direction parallel with the axis of the film roll, and transversely of the optical axis of the lantern, in order to bring the slide track into registry, at the same time moving the film track out of registry. Having shown the particular slide or slides desired, he may then readily restore the apparatus to the position shown in Fig. 3, and proceed with the projection of pictures from the film.

Furthermore, with the tracks in the positions shown either in Fig. 3 or Fig. 4, it is possible at any time, if desired, to rotate the plates 11 and 14 and associated parts about the lens tube 2 through 90° so as to change the position of the picture being shown from vertical to horizontal, or vice versa. The vertical position of the picture tracks is shown in dotted lines in Fig. 3.

While I have shown and described the two picture tracks as designed for film and for slides, respectively, it will, of course, be obvious that instead of the slide track, a second film track may be provided, together with the accompanying roll or spool holders.

While I have referred to "pictures" and "picture elements," it will of course be understood that by these terms I mean to include maps, drawings, written or printed words, or figures, or any other matter which it is desired to project.

What I claim is:

1. The combination with a projection apparatus, of a slide track, a film strip guide, a common support on which said track and guide are rigidly secured, means for mounting said support so that it may be rotated about the optical axis of the apparatus, and means whereby said support may be shifted transversely of said axis so as to selectively bring into operative position either said slide track or film guide, as desired.

2. The combination with a projection apparatus, of a slide track, a film strip guide, a common support on which said track and guide are mounted, means carried by said support at each side of the optical axis of the apparatus for holding a roll of film, and means whereby said support may be shifted in a direction parallel with the axis of the film roll so as to bring either said slide track or said film guide and roll holders into operative position, as desired.

3. The combination with a projection apparatus, of means for feeding a flexible picture strip lengthwise across the optical axis thereof to project pictures successively therefrom, guide means whereby a separate set of pictures on independent slides may also be moved across said axis into and out of display position, and means whereby said feeding means and guide means may be manually shifted as a unit transversely of the length of said picture strip, so as to bring either set of pictures selectively into alignment with the optical axis.

4. The combination with a projection apparatus, of independent means carried thereby for guiding two separate sets of picture elements in substantially the same plane, said guiding means being so constructed that the respective picture elements may be moved therealong at will into and out of display position, and means whereby said guiding means may be manually shifted as a unit in a direction parallel with said plane and transversely of the guiding means and of the optical axis of the apparatus so as to selectively bring either of said sets of picture elements into registry with said optical axis.

5. The combination with a projection apparatus, of a pair of parallel guiding means for separate sets of picture elements, a common support to which said guiding means are rigidly secured, said guiding means extending transversely of the optical axis of the apparatus and so constructed that the picture elements may be moved therealong relative to said support into and out of display position, and means for mounting said support on said projection apparatus in such manner that it may be manually shifted in a direction at right angles to said guiding means, to bring either of said guiding means selectively into registry with said optical axis, as desired.

6. The combination with a projection apparatus, of a guide for film strips and a track for independent slides, said guide and track extending transversely of the optical axis of the apparatus and so constructed that film strips and slides may be moved respectively therealong into and out of display position, a common support on which said guide and track are mounted in non-overlapping, laterally spaced relation, means whereby said support may be manually shifted in its own plane so as to bring either said guide or track into operative position, as desired, and means for maintaining said support in either of the positions to which it may be shifted.

EDMUND C. STANTON.